United States Patent [19]
Nieblach

[11] 3,739,711
[45] June 19, 1973

[54] APPARATUS FOR CONTINUOUS PRODUCTION OF TOFFEE-SOFT CARAMEL AND SIMILAR MASSES OF THE SWEETS INDUSTRY

[75] Inventor: Gunter Nieblach, Bemerode, Germany

[73] Assignee: Otto Hansel GmbH, Hannover, Germany

[22] Filed: Apr. 19, 1971

[21] Appl. No.: 135,244

[52] U.S. Cl.................... 99/348, 259/8, 259/67
[51] Int. Cl................................................ B01f 7/20
[58] Field of Search................... 99/234 R, 234 A, 99/348; 259/66, 67, 8

[56] References Cited
UNITED STATES PATENTS
3,446,136  5/1969  Recas.................................. 99/234
2,753,158  7/1956  Rebechini........................... 99/348

Primary Examiner—Robert W. Jenkins
Attorney—Ernest G. Montague

[57] ABSTRACT

An apparatus for the continuous production of toffee-, soft-caramel- and similar masses of the sweets-industry having a boiling vessel equipped with stirring means, which comprises a continuously operating feeding device for the raw material to be boiled. An inlet is connected with the feeding device and an outlet is formed as an overflow.

14 Claims, 1 Drawing Figure

Patented June 19, 1973 3,739,711
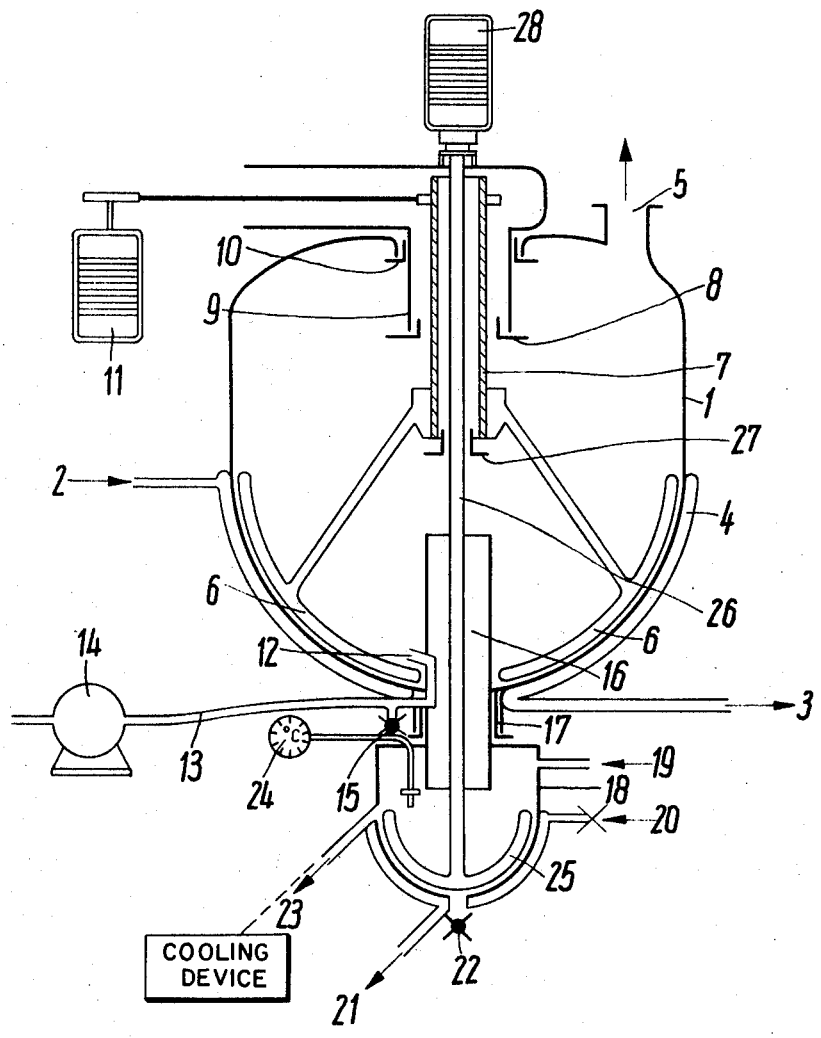

APPARATUS FOR CONTINUOUS PRODUCTION OF TOFFEE-SOFT CARAMEL AND SIMILAR MASSES OF THE SWEETS INDUSTRY

The present invention relates to an apparatus for the continuous production of toffee-, soft caramel- and similar masses of the sweets-industry. Such masses are conventionally made of a mixture of water, sugar, glucose, milk, fat, gel means, starch etc. Furthermore, colors, aroma material and similar additives must be added. The used raw materials are homogeniously mixed in an evaporation process. The evaporation takes place suitably in a boiling vessel equipped with a stirring device. In this the water quantity required for this dissolution of the sugar is so much reduced, that the finished article has only the required remaining water content. Furthermore, the mass must be termically treated as long, until the desired browning degree which is created by the caramelization of the sugar is reached. In the practice the masses used for working are produced in stirring work vessels, which are steam-heated and fed in charges. Later they are cooled in charges and further heated. The danger exists thereby that the boiled charges in an intermediate container which as applied, continues to brown at high temperatures with increased storing time. That means, that the mass removed at first from the intermediate container and the later removed mass is darker. This disturbs as a matter of course the further operation.

Furthermore, in the hard candy production it is known to use continuously operating boiling machines, so-called "twist boilers or thin layer evaporizers". They are, however, not to be used for the boiling of toffee- or soft caramel masses, since the milk solid parts used mainly during the boiling of such masses burn on the heated faces and thereby disturb the heat passage with the burned layer increasing with the thickness and prevent even completely depending upon the thickness. In the twist boiling machines by the high pressures created in the boilers a dispersion of the mass is obtained and thereby a solid burning of the milk solid ingredients is not to be avoided on the heated walls of the twist by the high pressures created in the boiling twists. In thin layer evaporizers, by a fast rotating rotor a burning is extensively prevented, however, the evaporation time period is so short, that the mass for the required burning must be termically after-treated. This after-treatment is difficult to control and requires exactly operating dosing pumps and further control members. Different masses, in particular those with very high milk ingredients, cannot be produced in the thin layer evaporizers anymore, since in these systems certain pressures are created, which lead to the dispersion and thereby an omission of the rigid milk ingredients. All these draw-backs are removed by the invention, by providing an apparatus for the continuous production of toffee-, soft caramel- and similar masses of the sweets-industry, which is equipped with a boiling vessel and a stirring device operating therein. In accordance with the present invention a continuously operating feeding arrangement for the inlet connected therewith for the raw material to be boiled and an outlet formed as an overflow are provided, which is connected by means of heating conduits and the further working stations. In this connection the steam-heated boiling vessel equipped with the built-in stirring device is fed at about the lowermost position of its inner space continuously with an already premixed raw material belonging to the recipe. By this stirring means, the mixture is set along the heated wall and thereby concentrated. Due to the large surface formed by the stirring device the mass can release easily the created water vapor, so that no overpressures are created which lead to a dispersion. On the other hand, the overflow formed due to the continuous feeding leads through an overflow tube provided centrally in the boiling vessel. This overflow is in accordance with the present invention for the control of the boiling process and of the remaining duration of the mass in the boiling vessel, respectively, variable in its height.

Advantageously one or plurality of further preferably smaller boiling vessels follow the overflow of the mentioned boiling vessel. In this additional vessel the additives as aroma, colors and etc. which normally are added at the end of the boiling period, are mixed-up. After this treatment the mass flows over a further overflow tube or another type of output to a cooling device. A continuously operating cooling device is likewise following and finally to the further known working stations.

The concept of the present invention permits the most different embodiments.

With these and other objects in view which will become apparent in the following detailed description, the present invention, which is shown by example only, will be clearly understood in connection with the accompanying drawing in which the only FIGURE is a schematic elevation partly in section of the apparatus designed in accordance with the present invention.

Referring now to the drawing, the preferably upright boiling vessel 1 is at least in its lower part 4 designed with a double wall and connected with a heating means, feeding conduit and its removal conduit 3, respectively. In the upper part is disposed the vapor outlet 5, which can be under circumstances also in operative connection with a producer of pressure below atmospheric pressure.

Inside of the boiling vessel 1 is disposed a stirring device, which comprises substantially two wings 6, which are secured to a hollow axle 7 and adjusted as to their shape to the configuration of the boiling body. The hollow driving axle 7 for the wings 6 of the stirring device is mounted with an intermediate arrangement of a sealer 8 in an insert 9, which is provided with the intermediate arrangements of sealers 10 in the ceiling of the boiling vessel 1. The drive of the stirring axle 7 takes place by a schematically shown driving motor 11.

At about the lowermost position of the vessel 1 is disposed the mass inlet 12 which is connected with a feeding conduit 13 passing through the bottom of the vessel and a preferably continuously operating feeding pump 14. The conduit 13 can be emptied below the vessel through a valve 15 if necessary. On the other hand in the lower part of the vessel 1 an upright overflow tube or outlet 16 is provided, of which its overflow height or level is settable and it is sealed operatively to the bottom of the vessel by inserts, sealer or the like 17. By more or less further moving-in of the overflow tube 16 into the inside of the vessel, the remaining time-period of the boiling mass in the boiling vessel 1 can be varied.

In the shown embodiment of the boiling arrangement, the overflow tube 16 terminates from above in an additional smaller boiling vessel 18 disposed below the main boiling vessel 1. The smaller boiling vessel 18 is equipped at its upper part with a feeder 19 for aroma material, colors, etc. Also this vessel is heated by means of heat conduits 20 and 21 at least in its lower part in the described manner. By an outlet 22 provided at the lowermost position the vessel can, by example, in order to clean the same, be emptied. On the other hand, however, in the upper part of the vessel 18 an overflow 23 is provided, by which the mass if necessary after being treated can flow off. It goes from here either directly to the further working stations, to a continuously operating cooling device 26, respectively. By a thermometer 24, the after-treating temperature in the vessel 18 can be read.

Similarly as the main vessel 1, the additional vessel 18 has also a stirring device, which is formed by the wings 25 of the stirring device sitting on the axle 26. By intermediate arrangement of sealers 27, the stirring device axle 26 passes through the overflow tube 16, the boiling vessel and the hollow drive axle 7 for the stirring device 6. The drive of the stirring device 25,26 takes place by a motor 28, and in particular independent from the stirring work drive 11 of the main vessel. This means that the stirring device depending upon the requirement could operate with a different speed.

It is to be understood that if the conditions require also more than two boiling devices can be disposed on top of each other, which however, all operate in accordance with the same principle.

The here described boiling device can be used with particular advantage for toffee-, soft caramel- and similar masses. It is also possible, however, to produce a gelee of fondant or by example marzipan and all other operations of sweets manufacturing.

While I have disclosed one embodiment of the present invention it is to be understood that this embodiment is given by example only and not in a limiting sense.

I claim:

1. An apparatus for the continuous production of toffee-, soft-caramel- and similar masses having a boiling vessel equipped with an inlet and an outlet comprising
    a stirring means disposed inside said boiling vessel,
    a continuously operating feeding device,
    an inlet disposed in a lowermost position of said boiling vessel and connected with said feeding device,
    an outlet formed as an overflow in said boiling vessel being disposed higher relative to said inlet.

2. The apparatus, as set forth in claim 1, which includes
    feeding conduits connecting said outlet with additional working stations.

3. The apparatus, as set forth in claim 1, which includes
    feeding conduits connecting said outlet with a continuously operating cooling device.

4. The apparatus, as set forth in claim 1, wherein said inlet is disposed at about the deepest position of said boiling vessel.

5. The apparatus, as set forth in claim 1, wherein said overflow forming the outlet is about centrally disposed in the boiling vessel.

6. An apparatus for the continuous production of toffee-, soft-caramel- and similar masses of the sweets industry having a boiling vessel equipped with stirring means, comprising
    a continuously operating feeding device for the raw material to be boiled,
    an inlet connected with said feeding device,
    an outlet formed as an overflow, and
    means for varying the high level of said overflow for controlling the boiling process.

7. An apparatus for the continuous production of toffee-, soft-caramel- and similar masses of the sweets industry having a boiling vessel equipped with stirring means, comprising
    a continuously operating feeding device for the raw material to be boiled,
    an inlet connected with said feeding device,
    an outlet formed as an overflow,
    stirring means having wings, and
    said overflow is disposed in the middle axis of the upright boiling vessel, and is enclosed by said wings of said stirring means moving around said boiling vessel, and
    said material inlet is provided at about the lowermost position of said boiling vessel in immediate vicinity with said overflow passing the bottom of said boiling vessel.

8. An apparatus for the continuous production of toffee-, soft-caramel- and similar masses of the sweets industry having a boiling vessel equipped with stirring means, comprising
    a continuously operating feeding device for the raw material to be boiled,
    an inlet connected with said feeding device,
    an outlet formed as an overflow, and
    at least one additional boiling vessel equipped with stirring means follows said overflow of said boiling vessel.

9. The apparatus, as set forth in claim 8, wherein said additional vessel is equipped with a feeding conduit for ingredients.

10. The apparatus, as set forth in claim 8, wherein said additional vessel has a lower capacity than said first mentioned boiling vessel.

11. The apparatus, as set forth in claim 8, wherein said additional smaller boiling vessel constitutes an after-carmelization pot.

12. The apparatus, as set forth in claim 8, wherein said additional smaller boiling vessel is disposed centrally below said first mentioned boiling vessel,
    an overflow tube forming the outlet of said last mentioned boiling vessel projects into said additional vessel, and
    a driving axle for said stirring means of said additional vessel projects through said stirring means, said overflow tube, said first mentioned boiling vessel and a hollow stirring means driving axle.

13. The apparatus, as set forth in claim 8, which includes
    stirring means drives of said first mentioned vessel and said additional vessel are independent.

14. The apparatus, as set forth in claim 13, wherein on the last of said boiling vessels required for the preparation of the mass, said last of said boiling vessels being equipped with an overflow, a continuously operating cooling device is connected.

* * * * *